United States Patent [19]

Baugher

[11] 3,930,046

[45] Dec. 30, 1975

[54] PROCESS FOR PREPARING A MEAT FLAVORING

[75] Inventor: William Lewis Baugher, Logan Township, Dearborn County, Ind.

[73] Assignee: The Procter & Gamble Company, Cincinnati, Ohio

[22] Filed: Dec. 3, 1974

[21] Appl. No.: 529,155

[52] U.S. Cl. ............................................... 426/533
[51] Int. Cl.² .................... A23L 1/227; A23L 1/231
[58] Field of Search ............ 426/533, 583, 652, 650

[56] References Cited
UNITED STATES PATENTS

| | | | |
|---|---|---|---|
| 2,934,437 | 4/1960 | Morton et al. | 426/533 |
| 3,394,015 | 7/1968 | Giacino | 426/533 |
| 3,394,016 | 7/1968 | Bidmead et al. | 425/533 X |
| 3,493,395 | 2/1970 | Saeters | 426/533 |

*Primary Examiner*—A. Louis Monacell
*Assistant Examiner*—Esther L. Massung
*Attorney, Agent, or Firm*—Ronald L. Hofer; Louis G. Xiarhos

[57] ABSTRACT

A meat-flavored composition comprising: (1) a first flavor made by reacting a mixture of about 10 parts hydrolyzed whey protein, from about 0.8 to about 4 parts xylose and from about 0.8 to about 4 parts cysteine; and (2) a second flavor made by reacting a mixture of about 10 parts hydrolyzed whey protein and from about 0.8 to about 4 parts thiamine; the first and second flavors being in a ratio of from about 1:0.1 to about 1:10. The meat-flavored composition provides a meat-like flavor closely resembling the flavor and aroma of natural meat for use in gravies, sauces, soups, simulated meats, meat extenders, and the like.

6 Claims, No Drawings

PROCESS FOR PREPARING A MEAT FLAVORING

FIELD OF THE INVENTION

The present invention relates to a meat flavored composition closely resembling the flavor and aroma of natural meat. The composition may be added to foodstuffs such as gravies, sauces, soups, meat extenders, and synthetic meats for the purpose of enhancing or introducing meat-like aromas and flavors.

THE PRIOR ART

Much research and development has been conducted to develop meat-like flavors and aromas to enhance or impart meat-like flavors and aromas to foodstuffs. Several processes are taught in the patent literature to provide desirable meat-like flavor compositions.

U.S. Pat. No. 3,493,395 Feb. 3, 1970, to Soeters teaches a process for preparing a savory meat flavored composition in which a mixture of an amino acid, a carbohydrate, and a fatty material is heated to a temperature of from 100° to 140°C. until a savory meat flavor is developed and the composition is substantially water free. The Soeters patent teaches that the amino acid may be obtained by hydrolysis of proteins of animal or vegetable origin and that a pork-like flavor is obtained when the amino acid is a hydrolysate which consists of cysteine or is rich in cysteine.

U.S. Pat. No. 3,394,016 June 2, 1968, to Bidmead et al. teaches a process for producing a meat flavored composition by reacting thiamine with an animal, fish, or vegetable protein hydrolysate.

Despite these prior art attempts to make flavoring compositions which simulate the flavor of natural meats, truly authentic, inexpensive, meat-like flavors have not yet been developed. Prior art flavoring compositions are often expensive, or made by complex methodology, or lacking in certain flavor notes that contribute to the full-bodied flavor of natural meat.

Accordingly, it is an object of the present invention to provide a meat-like flavor and a process for making the flavor which is superior in these respects to meat flavor compositions and methods taught in the art. Thus, it is an object of the present invention to provide a method for producing a meat flavoring composition closely resembling the flavor and aroma of natural meat. And it is an object of the present invention to provide a process for making a meat flavoring composition which is inexpensive and uncomplicated.

Further, it is an object of the present invention to provide a process for making a meat flavoring composition which is preferred at least equally to natural meat flavor.

All parts and percentages used herein refer to parts or percentages by weight unless otherwise indicated. All preferred processing steps or conditions are preferred because of the better flavor obtained by the use hereof.

SUMMARY OF THE INVENTION

A meat-like flavoring composition is made by a process comprising the steps of:

1. reacting for from 3 minutes to 24 hours at a temperature of from 60° to 180°C., a mixture of about 10 parts hydrolyzed whey protien, from about 0.8 to about 4 parts xylose, and from about 0.8 to about 4 parts cysteine;
2. reacting for from 3 minutes to 24 hours at a temperature of from 60° to 180°C., a mixture of about 10 parts hydrolyzed whey protein and from about 0.8 to about 4 parts thiamine; and
3. blending about 1 part of the product of step (1) with from about 0.1 to about 10 parts of the product of step (2).

The resulting flavor composition is a meat-like flavor closely resembling the flavor and aroma of natural meat which can be added to gravies, sauces, meat extenders, meat replacers, and other foodstuffs where meat flavor are desirable.

DESCRIPTION OF THE INVENTION

A full bodied meat-like flavoring composition is made by a process comprising the steps of:

1. reacting for from 3 minutes to 24 hours at a temperature of from 60° to 180°C. a mixture of about 10 parts hydrolyzed whey protein, from about 0.8 to about 4 parts xylose, and from about 0.8 to about 4 parts cysteine;
2. reacting for from 3 minutes to 24 hours at a temperature of from 60° to 180°C., a mixture of about 10 parts hydrolyzed whey protein and from about 0.8 to about 4 parts thiamine; and
3. blending about 1 part of the product of step (1) with from about 0.1 to about 10 parts of the product of step (2).

The meat flavoring product made in accordance with the present invention has a flavor and aroma simulating that of beef, and more particularly, that of roast beef. The exact flavor desired can be adjusted to some extent by varying the reaction conditions employed in the process of the present invention and by varying the ratio of the components of the blended final flavor composition. Increasing the proportion of the product of step (1) in the blended flavor composition increases the roasted flavor note of the composition. Increasing the proportion of the product of step (2), increases the boiled flavor note of the composition. The specific proportion of the two ingredients of the final flavor composition is determined by the particular blend of roasted and boiled flavor notes desired.

The hydrolyzed whey protein employed in steps (1) and (2) of the present invention is obtained from whey. Whey is the liquid which is separated from the curd after milk is coagulated, for example, in cheesemaking. Whey is inexpensively and ordinarily obtained as the by-product from commercial production of cheeses. Whey contains certain protein constituents of milk, milk sugar, and minor amounts of fat and other soluble constituents of the milk. Whey is used in candies, special cheese products, and as an additive in foods intended for human consumption and in animal feeds and supplements.

Most of the moisture of whey may be removed to yield a dried whey product, or water may be removed from whey to yield a condensed whey product which contains less water than whey but more water than dried whey. The whey preferred for use in the present invention is condensed or dried whey. Both condensed whey and dried whey are commercially available. Whey protein is the proteinaceous content of whey.

The hydrolyzed whey protein used in the present invention can be obtained from whey or whey protein by methods known in the art, but it is believed that optimum results are achieved when the hydrolyzed whey protein is obtained in the following, preferred manner: Whey or whey protein is first hydrolyzed in a solution of from 2N to 8N hydrochloric acid, preferably in a solution of 5N hydrochloric acid until hydrolysis of the whey protein is substantially complete. This hydrolysis reaction may require from a few minutes to many hours depending upon the temperature and the concentration of acid. For example, a reaction conducted at 108°C. in a solution of 5N hydrochloric acid would probably be sustantially complete in about 16 hours.

After the hydrolysis, the acidic solution of hydrolyzed whey protein is adjusted to a pH of from about 5 to 6. This pH adjustment may be carried out by the addition of a suitable amount of a non-toxic alkali such as sodium hydroxide, potassium hydroxide, or calcium hydroxide. After the pH adjustment, the solution is allowed to cool to room temperature and is filtered to remove humins and other insolubles. The filtrate, i.e. the solution, contains hydrolyzed whey protein and is suitable for use in steps (1) and (2) of the present invention. Best results are obtained when the reactions of steps (1) and (2) are conducted with utilization of the solution or filtrate obtained from the hydrolysis reaction. While the hydrolyzed product can be dried prior to utilization in the reactions of steps (1) and (2), flavor degradation or alteration tends to be promoted and drying is, thus, desirably avoided.

In step (1) of the present invention, about 10 parts of hydrolyzed whey protein is reacted with from about 0.8 to about 4 parts xylose and 0.8 to about 4 parts cysteine. Preferably about 10 parts hydrolyzed whey protein is reacted with from about 2 parts xylose and about 2 parts cysteine. This reaction is carried out by heating an aqueous solution containing the proper proportions of hydrolyzed whey protein, xylose and cysteine to a temperature of from about 60°C. to about 180°C. with a temperature range of from about 70°C. to about 110°C. being preferred, and a temperature range from about 85°C. to about 95°C. being most preferred, and maintaining the solution at this temperature for from about 0.25 hours to about 5 hours, preferably for from about 1.0 hours to about 2 hours.

In a preferred embodiment of the present invention, a lipid layer is placed over the reaction mixture before the reaction is carried out. This is particularly desirable if the reaction is run at a relatively high temperature because the lipid layer traps lipid soluble meat-like volatiles given off as reaction products from water soluble reactants. The lipid layer may vary in kind and quantity depending on the intended use and flavor concentration, but the amount of lipid is usually about 5% to about 30% of the weight of the reaction mixture. In general, almost any edible oil or fat may be used provided it has an acceptable taste after the heat treatment. For this reason, highly unsaturated oils are less acceptable than tallow, lard, and partially hydrogenated vegetable oils. Partially hydrogenated oils are preferred.

In step (2) of the present invention, about 10 parts hydrolyzed whey protein are reacted with from about 0.8 to about 4 parts thiamine. It has been discovered that optimum results are obtained by the use of the ratio of about 10 parts hydrolyzed whey protein to about 2 parts thiamine reactant.

The reaction of step (2) is carried out by heating an aqueous solution containing hydrolyzed whey protein and thiamine in the proper proportions at temperatures of between about 60°C. and about 180°C. Preferably, this reaction is carried out at a temperature of from 70°C. to about 110°C. and most preferably within the temperature range of from about 85°C. to about 95°C. The reaction is pursued for a time which can be about 0.25 hours to about 5 hours with from about 1.0 to about 2.0 hours yielding optimum results.

As in the reaction of step (1) of the present invention, it is preferable to place a lipid layer over the reaction mixture to trap lipid soluble meat-like volatiles given off as reaction products from water soluble reactants. The examples of lipid layers suitable for use in the reaction of step (1) are also suitable for use in the reaction of step (2).

The third step of the present invention is to blend the reaction products of step (1) and step (2) to form a finished flavor. It has been discovered that a desirable blend is the blended ratio of about 1 part hydrolyzeed whey protein/xylose/cysteine flavor to about 0.1 to 10 parts hydrolyzed whey protein/thiamine flavor. The relative proportions of the first and second flavor components can be varied to suit the desired degree of "doneness" in the meat being simulated. A preferred ratio is about 1 part of the reaction product of step (1) with from about 0.2 to about 2.0 parts of the reaction product of step (2). One part of hydrolyzed whey protein/xylose/cysteine reaction product to about 0.5 parts hydrolyzed whey protein/thiamine reaction product is believed to be the optimum.

The blend of first and second flavor components can be adjusted to a pH of from 6 to 7 so as to improve stability of the product against flavor degradation. Best results are obtained when the product is adjusted to a pH in the range of from 6.5 to 6.9.

The finished flavor product of this invention is a truly authentic meat-like flavor for use in gravies, sauces, soups, meat extenders, meat analogs, and other foodstuffs where meat flavors are desirably and conventionally employed. The products resulting from this invention are in liquid form and can be used as flavorings or seasonings in this form or can be concentrated to dry, partially dry, or more concentrated liquid forms. The finished flavor products of this invention can be concentrated to paste or dry powder form without any loss in flavor potential. Examples of drying means suitable for this purpose include vacuum drying, spray drying, drum drying, thin-film drying, and freeze drying. These dried flavor compositions can be added to foodstuffs in the dry form or may be rehydrated and added to foodstuffs in the form of a solution.

The terms "cysteine" and "thiamine" as used herein contemplate the respective compounds and the non-toxic, physiologically acceptable salts thereof, such as the chloride salts.

The flavor compositions of this invention are suitable for incorporation into any foodstuff where the addition of authentic, meat-like flavor is desired. Such foodstuffs include gravies, sauces, meat extenders, meat replacers, and meat analogs. For example, the flavor compositions of this invention are suitable for incorporation into synthetic meats such as those disclosed in U.S. Pat. No. 3,693,533 Sept. 26, 1972, to Liepa; U.S. Pat. No. 3,814,823 June 4, 1974, to Yang et al.; and U.S. Pat. No. 3,840,679 Oct. 8, 1974, to Liepa et al.

The following examples are intended to illustrate this invention:

EXAMPLE 1

An authentic beef-flavor composition was made in accordance with the following procedures:

Part A

One hundred grams of whey containing 57 g. of protein was heated in 320.8 ml. of 5N hydrochloric acid for 16 hours at 108°C under reflux conditions. The solution was allowed to cool to room temperature (i.e., about 22°C) and was then neutralized to a pH of 5.8 by the addition of 151 g. of a solution of 50% sodium hydroxide. The mixture was then filtered using a paper filter to remove humins and other insolubles. The filtrate, which contained hydrolyzed whey protein, was employed in the reactions of Parts B and C.

Part B

A mixture of 39.9 g., on a dry protein basis, of the hydrolyzed whey of Part A, 7.84 g. of cysteine, and 7.84 g. of xylose was heated at 90°C. for 1.5 hours in a glass vessel and allowed to cool to room temperature, i.e., about 22°C;

Part C

A mixture of 17.1 g. on a dry protein basis of the hydrolyzed whey of Part A and 3.36 g. of thiamine hydrochloride was heated at 90°C. for a period of 1.5 hours and allowed to cool to room temperature, i.e., about 22°C.

Part D

A blended flavor composition was made by gently mixing 401.5 g. of the reaction product of Part B with 168.8 g. of the reaction product of Part C.

The blended flavor composition of this example was an authentic meat-like flavor with a boiled beef flavor note and a roasted beef flavor note.

EXAMPLE 2

An authentic beef-like flavor composition was made in accordance with the procedures of EXAMPLE 1 except that about 44.7 g. and 19.2 g. of cottonseed oil having an iodine value of about 105 was added to the reaction mixtures of Parts B and C, respectively. This fat phase served to entrap the volatile flavor components given off during the heating of the respective reaction mixtures. The blend of the flavor composition was made by mixing 447 g. of the reaction product of Part B including the 44.7 g. of cottonseed oil with 188 g. of the reaction product of Part C including the 19.2 g. of cottonseed oil. The resulting final blended flavor composition had an authentic beef flavor exhibiting both roasted beef flavor notes and boiled beef flavor notes, the roasted notes being predominant. The composition is especially suited as a flavor additive to foodstuffs where a hardy roast beef flavor is desired.

EXAMPLE 3

A flavor composition is prepared according to the procedure of EXAMPLE 2 except that 188 g. of the product of Part B is admixed with 447 g. of the product of Part C. The flavor composition is characterized by a preponderance of boiled beef flavor notes.

What is claimed is:

1. A meat-flavored composition comprising:
   1. a first flavor made by reacting a mixture of about 10 parts hydrolyzed whey protein, from about 0.8 to about 4 parts xylose and from 0.8 to about 4 parts cysteine; and
   2. a second flavor made by reacting a mixture of about 10 parts hydrolyzed whey protein and from about 0.8 to about 4 parts thiamine; said first and second flavors being in a ratio of first to second flavor of from about 1:0.1 to about 1:10.

2. The meat-flavored composition of claim 1 wherein the ratio of first to second flavor is from about 1:0.2 to about 1:2.

3. A process for making a meat-like flavoring composition comprising:
   a. reacting for from 3 minutes to 24 hours at a temperature of from 60° to 180°C a mixture of about 10 parts hydrolyzed whey protein, from about 0.8 to about 4 parts xylose and from about 0.8 to about 4 parts cysteine;
   b. reacting for from 3 minutes to 24 hours at a temperature from 60° to 180°C a mixture of about 10 parts hydrolyzed whey protein and from about 0.8 to about 4 parts thiamine;
   c. blending about 1 part of the product of step (a) with from about 0.1 to about 10 parts of the product of step (b).

4. The process of claim 3 wherein in step (a) about 10 parts hydrolyzed whey protein are reacted with from about 2 parts xylose and about 2 parts cysteine at a temperature of from about 70°C to about 110°C for from about 1.0 hour to about 2 hours.

5. The process of claim 3 wherein in step (b) about 10 parts hydrolyzed whey protein are reacted with about 2 parts thiamine at a temperature of from about 70°C to about 110°C for from about 1.0 to about 2.0 hours.

6. The process of claim 3 wherein from about 5% to about 30% by weight of the reaction mixture of lipid is added to each of the reaction mixtures of steps (a) and (b).

* * * * *